United States Patent [19]

Kassos

[11] 4,176,620

[45] Dec. 4, 1979

[54] AQUARIUM-TERRARIUM TANK

[76] Inventor: Thomas G. Kassos, 120 Brookmeade Dr., Pittsburgh, Pa. 15237

[21] Appl. No.: 844,560

[22] Filed: Oct. 25, 1977

[51] Int. Cl.² .......................................... A01K 64/00
[52] U.S. Cl. ..................................................... 119/5
[58] Field of Search ..................... 119/5; D30/6–12; 47/69

[56] References Cited

U.S. PATENT DOCUMENTS

| 3,786,781 | 1/1974 | Poulsen | 119/5 |
| 3,804,064 | 4/1974 | Kuneman et al. | 119/5 |
| 4,081,666 | 3/1978 | Roehrick | 119/5 X |

*Primary Examiner*—Hugh R. Chamblee
*Attorney, Agent, or Firm*—Thomas H. Murray; Clifford A. Poff

[57] ABSTRACT

The edge surfaces of a terrarium floor are adhered to side walls of an aquarium tank. A terrarium compartment has a triangular cross section formed by the space above the terrarium floor and part of the side walls of the aquarium tank. The forward edge of the terrarium floor is spaced from the front or the side wall of the aquarium tank to form an opening therebetween of sufficient size for access to the body of water below the terrarium floor and movement of an amphibian between the body of water and the terrarium compartment. In a further embodiment, the terrarium compartment further includes a terrarium side wall adhered along the bottom edge to the terrarium floor to form an upwardly-extending barrier wall and thereby defines the terrarium compartment with a cross-sectional shape of a keystone.

6 Claims, 4 Drawing Figures

AQUARIUM-TERRARIUM TANK

BACKGROUND OF THE INVENTION

This invention relates to a tank apparatus embodying a construction of parts for the combined use as an aquarium tank and a terrarium. More particularly, the present invention relates to such a tank wherein a terrarium compartment is formed by a floor or a floor and a side wall joined together to form a terrarium compartment by utilizing part of the side walls of an aquarium tank, the arrangement being such that the terrarium compartment is spaced from the front wall of the aquarium above the bottom wall thereof for access to the body of water in the aquarium compartment.

The use of an aquarium tank by a hobbyist is varied and includes providing a water environment for fish and an environment suitable for amphibians such as turtles and salamanders. For amphibians, the environment should include both in-water and out-of-water facilities. U.S. Pat. Nos. 3,141,442, 3,699,921 and 3,804,064 suggest the use of a ramp in an aquarium tank to provide an out-of-water environment for an amphibian. However, the out-of-water environment provided by the various forms of ramps does not include a terrarium compartment nor do they enhance the aesthetic appearance of the aquarium.

SUMMARY OF THE INVENTION

It is an object of the present invention to provide a tank adapted for use as an aquarium and a terrarium to enhance the aesthetic appearance of the tank and increase the usefulness of the tank by a hobbyist and the like.

In accordance with the invention, there is provided the combination of an aquarium tank having a bottom wall and vertically-extending side walls for containing a body of water, and a terrarium floor adhered along edge surfaces to the vertical face surfaces of the aquarium tank at a location above the bottom wall thereof, the terrarium floor extending in an upwardly-inclined manner relative to the bottom wall to form a terrarium compartment having a triangular cross section formed by the terrarium floor and part of the walls of the aquarium tank, one edge surface of the terrarium floor being spaced from one side wall of the aquarium tank to form an opening therebetween of sufficient size for access to the body of water below the terrarium floor.

In the preferred form of the present invention, the aforementioned aquarium has rectangularly-shaped front and back walls. The terrarium floor extends along the back wall between the end walls while spaced from the front wall. The terrarium floor is adhered to the walls of the aquarium tank to form a water-tight terrarium compartment. In one form, the terrarium compartment has a triangular cross section formed by the terrarium floor and the back wall of the aquarium tank. In another form, the terrarium compartment has a keystone-shaped cross section formed by the addition of a terrarium side wall adhered along an edge surface to the terrarium floor.

These features and advantages of the present invention as well as others will be more fully understood when the following description is read in light of the accompanying drawings, in which.

Figure 1:
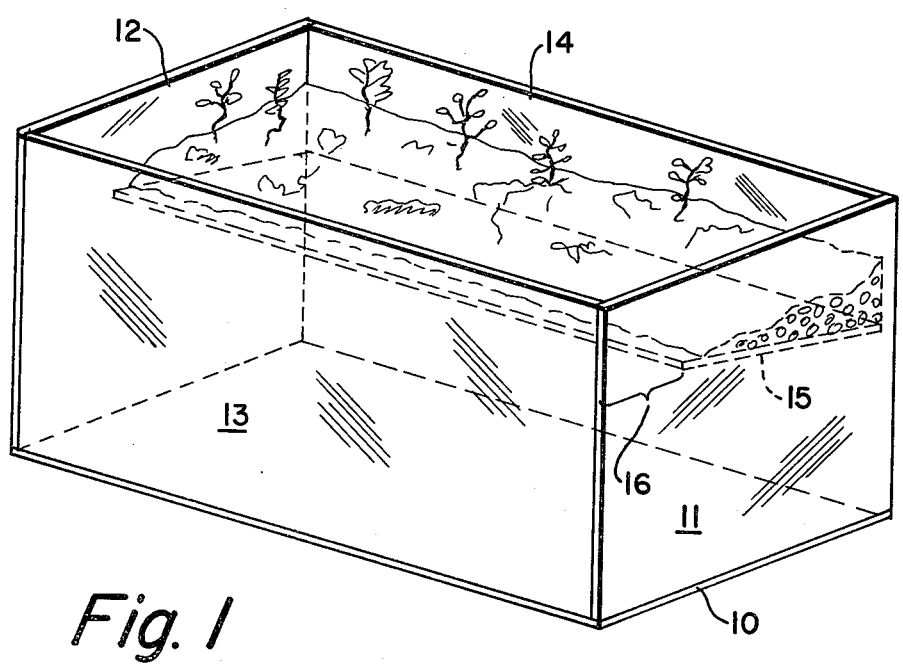
FIG. 1 is a perspective view of a tank according to one embodiment of the present invention.

The tank shown in FIG. 1 includes the usual bottom wall 10 joined about its peripheral edge to end walls 11 and 12 and front and back walls 13 and 14. The walls 10-14 are made from well-known forms of glass material. While not shown in the drawing, a metal frame may be used to join the walls together and, through the use of a sealant, form a water-tight tank. It is preferred, however, to use glue for adhering the walls together to form the water-tight tank. Any of the various well-known forms of glue may be used including silicone-based cement. The particular cement used should be non-toxic to both aquatic plants and animals. The glue is also used to adhere a terrarium floor 15 onto the inside face surfaces of back wall 14 and end walls 11 and 12. The terrarium floor extends in an upwardly-inclined manner toward the front wall 13 but spaced therefrom to form a gap 16 along the entire forward edge of the floor. It is apparent from FIG. 1 that the gap 16, in plan view, has a rectangular shape. The gap is of sufficient size to permit access to the body of water below the terrarium floor. The actual width of the gap is selected so that at least the hobbyist can pass his hand beyond the terrarium floor about the bottom wall 11 of the tank. The opening is sufficiently large to permit an amphibian to move between the body of water in the tank and the terrarium compartment. The terrarium floor is located at a distance of, for example, $\frac{1}{2}$ to $\frac{2}{3}$ of the height of the aquarium tank. As noted previously, the terrarium floor extends in an upwardly-inclined manner whereby a terrarium compartment is defined in cross section with a triangular shape. In the terrarium compartment, rocks or other dry-ground material form the terrarium environment which may additionally include measures taken to support plant life if desired.

While a rectangularly-shaped tank has been selected for the purpose of disclosing the present invention, it will be understood that other tank shapes may be used. Moreover, the terrarium floor 15 may be constructed to span the gap between the front and rear walls 13 and 14 extend from one side wall toward the opposite side wall. In this event, the gap 16 is formed between a side edge of the terrarium floor and one side wall of the tank.

Figure 2:
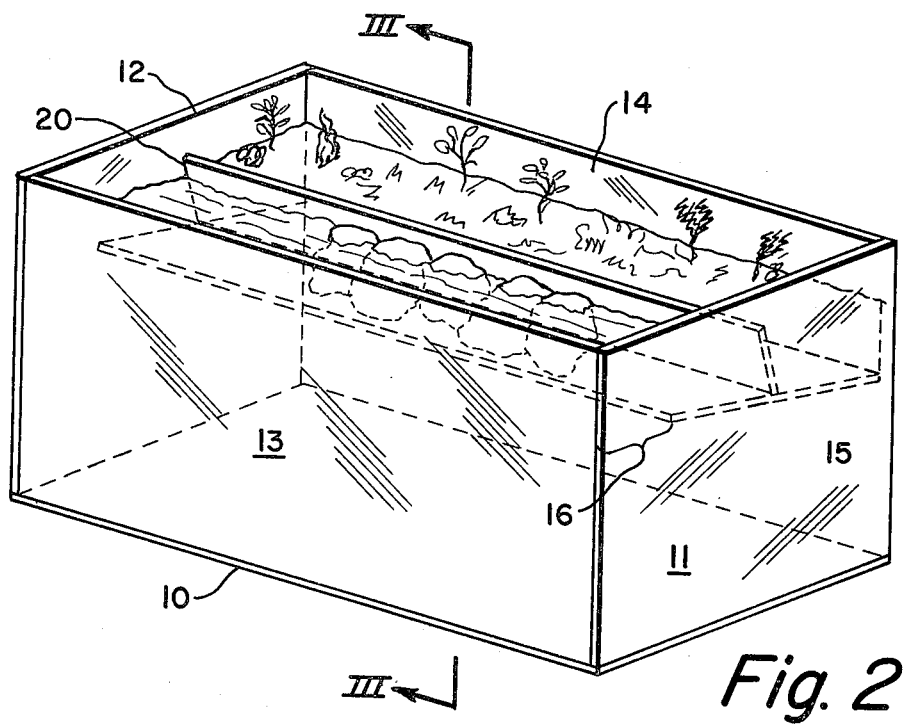
FIG. 2 is a perspective view of a tank according to a second embodiment of the present invention.
Figure 3:
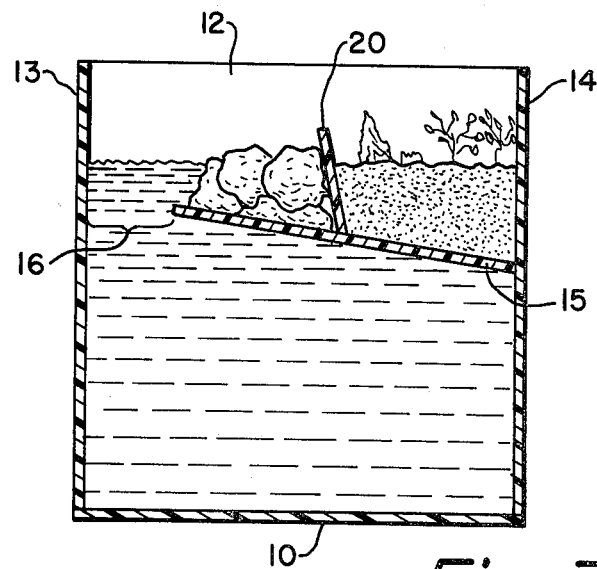
FIG. 3 is a sectional view taken along line III—III of FIG. 2.

FIGS. 2 and 3 illustrate a second embodiment of the present invention which differs from that already described in regard to FIG. 1 by the addition of a terrarium side wall 20. The wall 20 is secured along its bottom edge by glue or the like onto the upward face surface of terrarium floor 15. The terrarium side wall 20 forms a water barrier to inhibit the passage of water from the tank into the terrarium compartment which, in cross section, has a keystone shape. The shape of the terrarium compartment occurs because the terrarium side wall 20 diverges outwardly by an angular relation other than 90° with respect to the terrarium floor. In this way, the opening at the top of the terrarium compartment is larger than the opening along the bottom wall of the terrarium floor when viewed in plan. The terrarium side wall 20 may, if desired, be secured to form right angles with the terrarium floor 15. Moreover, the terrarium side wall may diverge outwardly from the terrarium compartment by forming an obtuse angle with the floor 15. It will be understood that the parts and description given in regard to FIG. 1 apply with equal effect to like parts bearing the same reference numerals in FIGS. 2 and 3.

Figure 4:
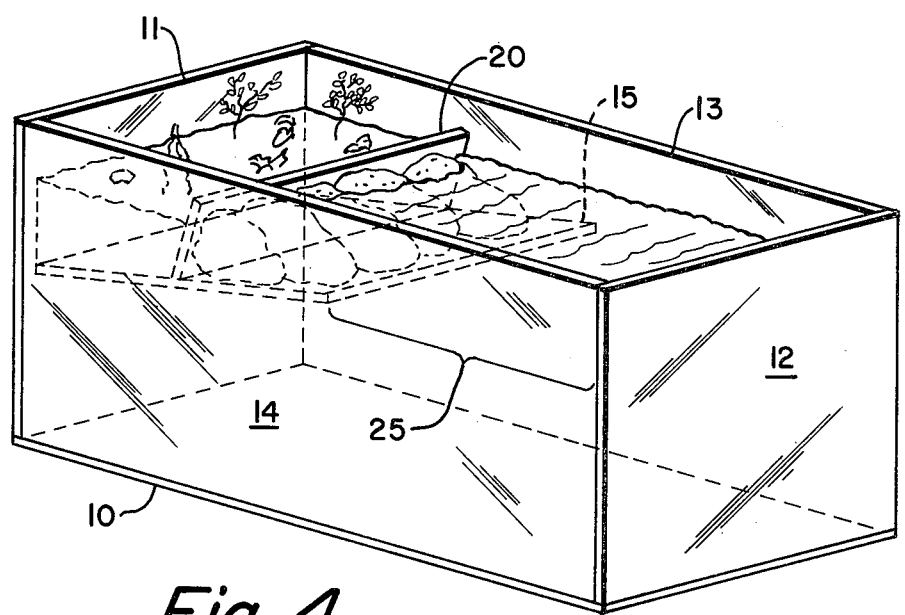
FIG. 4 is a perspective view of a tank according to a third embodiment of the present invention.

FIG. 4 illustrates the same basic parts as already described in regard to FIG. 3. However, these parts, bearing the same reference numerals, are arranged so as to form a gap 25 between the side edge of the terrarium floor 15 and side wall 12.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. The combination of an aquarium tank having a bottom wall and vertically-extending side walls for containing a body of water, and a terrarium floor adhered along edge surfaces thereof to the vertical face surfaces of said side walls at a location above said bottom wall, said terrarium floor extending in an upwardly-inclined manner relative to said bottom wall to form a terrarium compartment having a triangular cross section formed by said terrarium floor and part of said side walls thereabove, one edge surface of said terrarium floor being spaced from a side wall of said aquarium tank to form an opening therebetween of sufficient size for access to the body of water below the terrarium floor.

2. The combination according to claim 1 wherein the vertically-extending side walls of said aquarium tank consist of rectangular front and back walls and end walls, and wherein said terrarium floor extends along said back wall between said end walls.

3. The combination according to claim 2 wherein said terrarium floor is adhered onto the back and end walls of said aquarium tank to form a water-tight terrarium compartment, the front edge of said terrarium floor being spaced from said front wall to form a rectangular gap therebetween.

4. The combination according to claim 3 further comprising a terrarium side wall parallel with said back wall and adhered onto said terrarium floor and said end walls of said aquarium tank.

5. The combination according to claim 4 wherein said terrarium side wall extends upwardly from said terrarium floor to form a keystone-shaped terrarium compartment in cross section.

6. The combination according to claim 1 further comprising a terrarium side wall adhered along the bottom edge thereof to said terrarium floor to form an upwardly-extending barrier wall in the terrarium compartment.

* * * * *